No. 753,216. PATENTED FEB. 23, 1904.
A. D. HULQUIST.
TELESCOPIC SPRING POST FOR LOOSE LEAFED BOOKS, &c.
APPLICATION FILED JUNE 22, 1903.
NO MODEL.

Witnesses:
F. C. Barry
H. S. Gaither

Inventor:
Andrew D. Hulquist
by Frank D. Thomason
Attorney.

No. 753,216.

Patented February 23, 1904.

UNITED STATES PATENT OFFICE.

ANDREW D. HULQUIST, OF CHICAGO, ILLINOIS, ASSIGNOR TO J. S. McDONALD, OF CHICAGO, ILLINOIS.

TELESCOPIC SPRING-POST FOR LOOSE-LEAFED BOOKS, &c.

SPECIFICATION forming part of Letters Patent No. 753,216, dated February 23, 1904.

Application filed June 22, 1903. Serial No. 162,615. (No model.)

*To all whom it may concern:*

Be it known that I, ANDREW D. HULQUIST, a citizen of the United States, and a resident of Chicago, in the county of Cook and State of Illinois, have invented certain new and useful Improvements in Telescopic Spring-Posts for Loose-Leafed Books, &c., of which the following is a full, clear, and exact description.

The object of my invention is to provide a simple, cheap, and valuable improvement in the construction of the telescopic spring-posts for the backs of loose-leafed books, &c., whereby a machine-made part and several mechanical operations are dispensed with. This I accomplish by the means hereinafter fully described, and as particularly pointed out in the claims.

Figure 1:
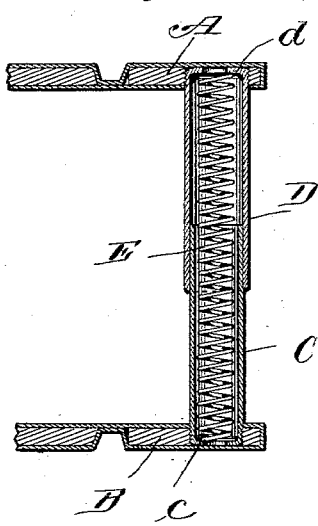
Figure 2:
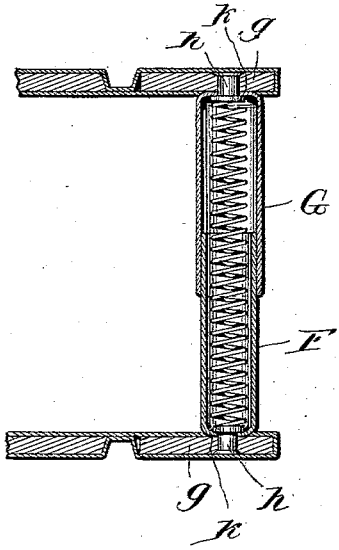
Figure 3:

In the drawings, Figure 1 is a longitudinal central section of a spring-post embodying my invention and of the clamping-plates to which the same is attached. Fig. 2 is a similar view of a modification thereof. Fig. 3 is a perspective view of one of said tubes.

Referring to the accompanying drawings, A and B represent the clamping-plates of the back of a loose-leafed account-book, ledger, &c. Locks are generally employed that connect these clamping-plates, and when the edges of the loose leaves of a ledger are inserted between these clamping-plates these locks hold them in clamped relation to each other. When these locks are unlocked, the expansion of the material confined between them separates the plates, assisted by the spring-posts. These posts comprise two tubes C and D, one of which is secured to and projects from plate A and the other of which is secured to and projects from plate B in alinement with the other tube, and tube C is of such diameter that it telescopes into tube D. In order to secure the tubes to plates A and B, it is customary to make a screw-threaded hole in said plates and screw the end of the tube into said plate. I also do this, as shown in Fig. 1 of the drawings; but before doing so I flange the end edges $c$ and $d$, respectively, of each tube inward and partially close the opening in the ends secured in the clamping-plates. These ends partially closed in this manner prevent the ends of the coil expansion-spring E, inclosed, as shown in the drawings, within the telescoping tubes, from extending out through said ends and provide seats for the same that dispense with the necessity of heads and the operations heretofore resorted to for fixing them in place in the ends of the tubes.

In Fig. 2 I show a different way of connecting the tubes to the clamping-plates. In this modification the tubes F and G are not tapped into holes made in the clamping-plates $f$ and $g$; but rivets $h$ are extended through the restricted opening in the ends $k$ of the tubes and out through rivet-openings in said plates and then their outer ends swaged into the countersink of said openings.

A great saving of material, time, and labor is effected by this change in the construction of the tubes of the spring-post, and a comparatively large saving in the cost of manufacturing the same is thus accomplished.

What I claim as new, and desire to secure by Letters Patent, is—

1. A telescopic spring-post for the backs of loose-leafed books, &c., comprising two clamping-plates; two telescoping tubes each having the edges of one end flanged inward and secured to said plates, respectively; and a coil-spring housed within said tubes and having its ends bear against the said flanged edges thereof.

2. A telescopic spring-post for the backs of loose-leafed books, &c., comprising two clamping-plates each having a screw-threaded opening therein; two tubes having the end edges of one flanged inward and the circumference thereof screw-threaded and tapped into said openings, the one in the one plate and the other in the other plate, in alinement and telescopic engagement with each other; and a coil-spring housed within said tubes and having its ends bearing against the flanged edges thereof.

3. In a telescopic spring-post for the backs of books, &c., two cylindrical tubes engaging each other and normally retained at the limit of their extended movement by a spring, said tubes having their outer ends flanged inward and detachably engaging clamping-plates.

In testimony whereof I hereunto set my hand this 11th day of May, 1903.

ANDREW D. HULQUIST.

Witnesses:
E. K. LUNDY,
FRANK D. THOMASON.